Dec. 11, 1945.　　　M. MALLORY　　　2,390,604
DEGASSER FOR INTERNAL-COMBUSTION ENGINES
Filed Aug. 1, 1944
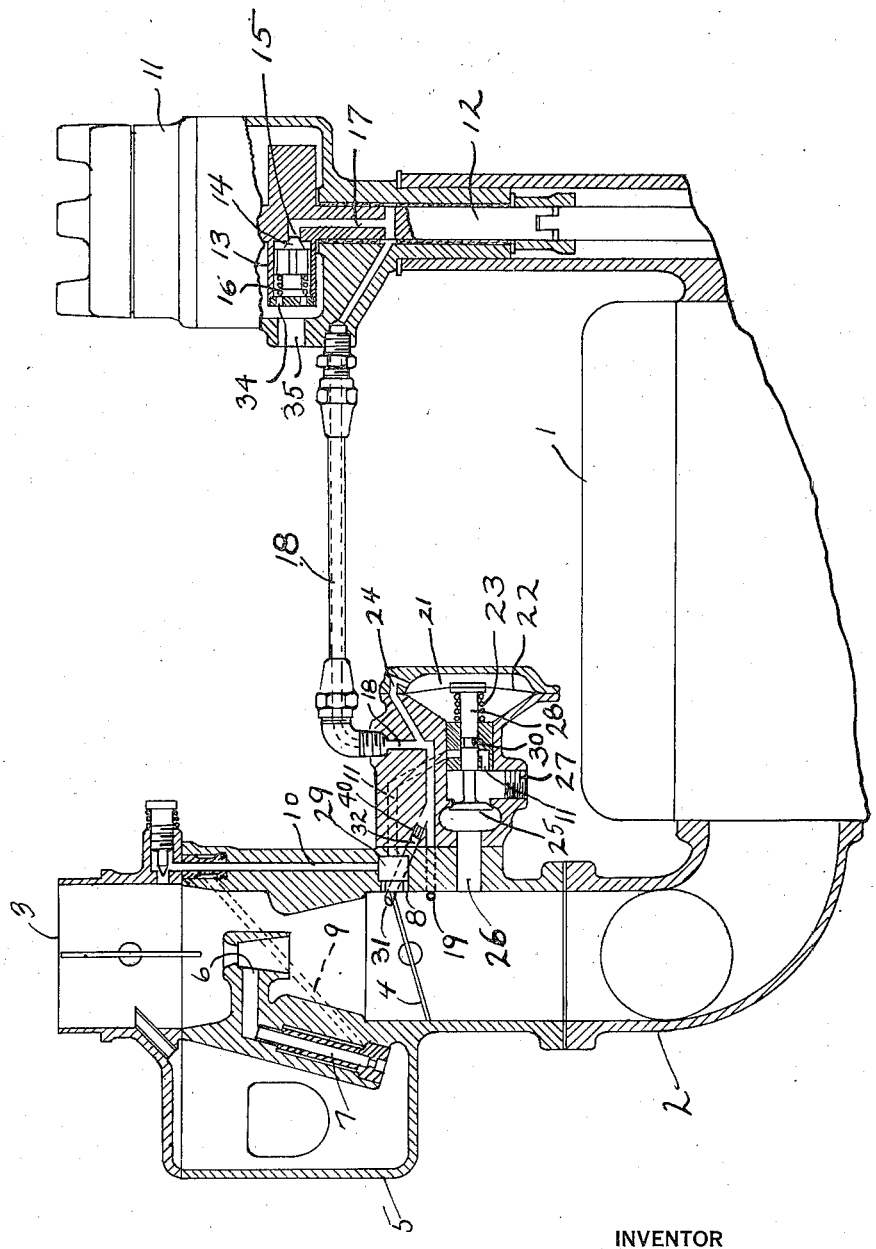
INVENTOR
MARION MALLORY
BY
ATTORNEYS Patented Dec. 11, 1945

2,390,604

UNITED STATES PATENT OFFICE 2,390,604

DEGASSER FOR INTERNAL-COMBUSTION ENGINES

Marion Mallory, Detroit, Mich.

Application August 1, 1944, Serial No. 547,612

9 Claims. (Cl. 123—103)

This invention relates to means for admitting a non-combustible charge into the manifold of an internal combustion engine when the vehicle is being decelerated on closed throttle and at the time the vehicle is driving the engine instead of the engine driving the vehicle. Such a device is commonly called a degasser for an internal combustion engine. Ordinarily under such conditions the vacuum increases tremendously in the intake manifold which makes the idle mixtures of the carburetor overly rich as well as creating excessive vacuum on top of the pistons to draw up oil. The overly rich mixture and oil vapors passing out of the exhaust are not only a waste of gasoline and oil but obnoxious odors are liberated.

It is an object of this invention to produce a device which will effectively eliminate this waste of gasoline and oil and the creation of such obnoxious odors when the engine is decelerating on closed throttle with the vehicle driving or over-running the engine.

Fig. 1 is a sectional view showing my device in combination with a carburetor and ignition system for an internal combustion engine.

The engine is referenced 1, the intake manifold 2, the air inlet for the carburetor 3, the butterfly throttle valve 4, the fuel float bowl 5, the main fuel nozzle or jet 6 connected by passageway 7 with the float bowl, idle orifice 8 connected by passageways 9 and 10 with the float bowl, distributor 11, distributor shaft 12 driven by the engine 1, centrifugal valve housing 13, centrifugal valve 14 controlling inlet orifice 15 to passageway 17 in shaft 12, compression spring 16 tending to hold valve 14 closed, conduit 18 which places passageway 17 in communication with orifice 19 in the intake passageway on the engine side of throttle valve 4, suction chamber 21, tension spring 23, passageway 24 which connects suction chamber 21 into passageway 18, valve 25 which controls air inlet port 26 into the intake passageway, passageway 27 to atmosphere which connects with passageway 26 when valve 25 is open, valve stem 28 connected to valve 25 and to flexible diaphragm 22, compression spring 23 tends to hold valve 25 closed, passageway 11 leading from passageway 27 to chamber 29. Valve stem 28 is provided with a circumferential groove 30 so that valve stem 28 acts as a spool valve controlling the flow of air through passageway 11 from passageway 27 to chamber 29. Chamber 29 also communicates with passageways 10 and 9 and idle orifice 8. Orifice 31 is positioned in the intake passageway just above the throttle valve in idle position and communicates by means of conduit 32 with conduit 18. The interior of valve housing 13 communicates through ports 34 in the valve housing and port 35 in the distributor housing to atmosphere. Thus, valve 14 controls communication between chamber 21, conduits 18 and 17 with atmosphere.

The operation of the device is as follows:

Assuming the engine is idling, the valve 14 is closed and there will be a suction at orifice 19 and channel 24. This suction is high enough to hold valve 25 closed. Although there is an air bleed orifice 31, it is restricted at 40 so that the suction device is not air bled enough to cause valve 25 to open. If the engine is speeded up and valve 14 opens, the suction device 21 would be air bled through line 18, but to speed the engine up, it is necessary to open throttle 4 far enough to place orifice 31 in the manifold vacuum and then there would be sufficient suction in the suction device 21 to prevent valve 25 from opening. As it is necessary to air bleed the suction device through line 18 and orifice 31, that is, at both places before valve 25 will open, it can be seen that throttle 4 must be closed so that orifice 31 will be on the atmospheric side of the throttle and the speed of the engine must be high enough to have centrifugal valve 14 open. Therefore, valve 25 can never open when the engine is pulling the vehicle because to do this valve 4 must be open wide enough to place orifice 31 in the manifold vacuum and when orifice 31 is in the high vacuum which obtains on the engine side of valve 4, valve 25 can never open. Weak compression spring 23 is preferably used to keep valve 25 on its seat when the engine is pulling at wide open throttle, at a low engine speed and the vacuum drops very low in the intake passageway and valve 14 is set to close at a very low speed, say, e. g., near idle speed.

When suction device 21 is air bled, port or groove 30 registers with conduit 11, permitting air to flow through port 27 and channel 11 to chamber 29. This air bleeds the idle fuel lines 9, 10 and prevents gasoline from flowing into the engine on deceleration with throttle valve 4 closed.

Obviously the speed at which the centrifugal valve 14 will open can be varied to suit the requirements of the specific engine with which my degasser is used. The idle speed of the engine for illustrative purposes could be 400 R. P. M. and the speed at which valve 14 opens can, for descriptive purposes only, be 800 R. P. M.

I claim:

1. In an internal combustion engine having an intake passageway and a throttle valve in said passageway, a port on the engine side of said throttle valve, a second valve controlling said port, means actuated through changes of pressure in the intake passageway on the engine side of said throttle valve for imparting movement to said second valve, an orifice in the intake passageway positioned adjacent said throttle valve and on the atmosphere side of the same when the throttle is closed, said orifice passing on to the engine side of said throttle valve as the same moves toward open position, a conduit connecting said pressure actuated means with the intake passageway on the engine side of the throttle valve, a second conduit connecting said orifice with the aforementioned conduit between the intake passageway and the below-mentioned speed actuated means, and means actuated in response to a predetermined engine speed for modifying the pressure in said pressure actuated means whereby said second valve opens and bleeds air into said intake passageway on the engine side of said throttle valve when the vacuum in the intake passageway exceeds a predetermined vacuum and the engine is operating above a predetermined speed.

2. In an internal combustion engine having an intake passageway and a throttle valve in said passageway, a port on the engine side of said throttle valve, a second valve controlling said port, means actuated through changes of pressure in the intake passageway on the engine side of said throttle valve for imparting movement to said second valve, an orifice in the intake passageway positioned adjacent said throttle valve and on the atmosphere side of the same when the throttle is closed, said orifice passing on to the engine side of said throttle valve as the same moves toward open position, a conduit connecting said pressure actuated means with the intake passageway on the engine side of the throttle valve, a second conduit connecting said orifice with the aforementioned conduit between the intake passageway and the below-mentioned speed acuated means, an air bleed to atmosphere for said suction device, and means controlling said air bleed to atmosphere for said suction device and actuated in response to a predetermined engine speed for admitting atmospheric air to said pressure actuated means whereby when the throttle valve is in idle position and the engine is operating above a predetermined speed said pressure actuated means opens said second valve and bleeds air into said intake passageway on the engine side of said throttle valve.

3. In an internal combustion engine having an intake passageway and a throttle valve in said passageway, a port on the engine side of said throttle valve, a second valve controlling said port, means actuated through changes of pressure in the intake passageway on the engine side of said throttle valve for imparting movement to said second valve, an orifice in the intake passageway positioned adjacent said throttle valve and on the atmosphere side of the same when the throttle is closed, said orifice passing on to the engine side of said throttle valve as the same moves toward open position, a conduit connecting said pressure actuated means with the intake passageway on the engine side of the throttle valve, a second conduit connecting said orifice with the pressure actuated means, and means actuated in response to a predetermined engine speed for modifying the pressure in said pressure actuated means whereby said second valve opens and bleeds air into said intake passageway on the engine side of said throttle valve when the vacuum in the intake passageway exceeds a predetermined vacuum and the engine is operating above a predetermined speed.

4. In an internal combustion engine having an intake passageway and a throttle valve in said passageway, a port on the engine side of said throttle valve, a second valve controlling said port, means actuated through changes of pressure in the intake passageway on the engine side of said throttle valve for imparting movement to said second valve, an orifice in the intake passageway positioned adjacent said throttle valve and on the atmosphere side of the same when the throttle is closed, said orifice passing on to the engine side of said throttle valve as the same moves toward open position, a conduit connecting said pressure actuated means with the intake passageway on the engine side of the throttle valve, a second conduit connecting said orifice with the pressure actuated means, an air bleed to atmosphere for said suction device, and means controlling said air bleed to atmosphere for said suction device and actuated in response to a predetermined engine speed for admitting atmospheric air to said pressure actuated means whereby when the throttle valve is in idle position and the engine is operating above a predetermined speed said pressure actuated means opens said second valve and bleeds air into said intake passageway on the engine side of said throttle valve, a restriction in said second conduit whereby the throttle must be in idle position with the said orifice on the atmosphere side of the throttle and the air bleed valve must be open before the pressure in the pressure actuated means will be sufficiently bled to atmosphere to cause said second valve to open.

5. In an internal combustion engine having an intake passageway and a throttle valve in said passageway, a port on the engine side of said throttle valve, a second valve controlling said port, means actuated through the suction in the intake passageway on the engine side of said throttle valve for closing said second valve, resilient means for opening said second valve whenever the pressure in the pressure actuated means rises above a predetermined value, an orifice in the intake passageway positioned adjacent said throttle valve and on the atmosphere side of the same when the throttle is closed, said orifice passing on to the engine side of said throttle valve as the same moves toward open position, a conduit connecting said suction actuated means with the intake passageway on the engine side of the throttle valve, a second conduit connecting said orifice with the suction actuated device, and an air bleed to atmosphere for said suction actuated device including a centrifugally unbalanced valve rotated in accordance with the speed of the engine and arranged to open said air bleed to atmosphere whenever the speed of the engine exceeds a predetermined speed whereby when the throttle valve is in idle position and the engine is running substantially above idle speed the centrifugally unbalanced valve will open to permit said suction actuated means to open said second valve and bleed the intake passageway on the engine side of the throttle valve to atmosphere.

6. The combination as set forth in claim 3 including a fuel jet operated in response to vacuum conditions in the intake passageway to feed fuel into the intake passageway, an air bleed to atmosphere for said fuel jet, and a valve controlled by said pressure actuated means for opening the air bleed to the fuel jet whenever said second valve is opened to thereby stop the flow of fuel into the intake passageway such as would otherwise occur when the throttle valve is closed and the engine is operating at a speed above idle speed.

7. In an internal combustion engine having an intake passageway and a throttle valve in said passageway, air bleed means for bleeding atmospheric air into said intake passageway on the engine side of said throttle valve, means actuated through changes of pressure in the intake passageway on the engine side of said throttle valve for controlling the above said air bleed means, and a speed controlled air bleed to atmosphere for said pressure actuated means, said speed controlled air bleed being constructed and arranged to close and cease bleeding air into said pressure actuated means whenever the engine falls below a predetermined speed whereby when the throttle valve is substantially closed and the engine is decelerating but still running above said predetermined speed the pressure actuated means responds to open said first mentioned air bleed means and admit air into the intake passageway on the engine side of said throttle valve.

8. The combination as set forth in claim 7 including a fuel jet operated in response to vacuum conditions in the intake passageway to feed fuel into the intake passageway, an air bleed to atmosphere for said fuel jet, and a valve controlled by said pressure actuated means for opening the air bleed to the fuel jet whenever said second valve is opened to thereby stop the flow of fuel into the intake passageway such as would otherwise occur when the throttle valve is closed and the engine is operating at a speed above idle speed.

9. In an internal combustion engine having an intake passageway and a throttle valve in said passageway, a port on the engine side of said throttle valve, a fuel jet operating in response to intake passageway suction to discharge fuel into the intake passageway, an air bleed to said fuel jet, valve means controlling said port and air bleed, means actuated through changes of pressure in the intake passageway on the engine side of said throttle valve for imparting movement to said second valve, a conduit connecting said pressure actuated means with the intake passageway on the engine side of the throttle valve, and means actuated in response to a predetermined engine speed for modifying the pressure in said pressure actuated means whereby said valve means opens and bleeds air into said intake passageway on the engine side of said throttle valve and also bleeds air into said fuel jet to stop the said discharge of fuel when the throttle is closed and the engine is operating above a predetermined speed.

MARION MALLORY.